(12) United States Patent
Chiang

(10) Patent No.: US 10,313,630 B2
(45) Date of Patent: Jun. 4, 2019

(54) MOBILE PHONE WITH FLUORESCENT SUBSTANCES

(71) Applicant: Zeppelin Corporation

(72) Inventor: Kuo-Ching Chiang, New Taipei (TW)

(73) Assignee: Zeppelin Corporation, Apia (WS)

( * ) Notice: Subject to any disclaimer, the term of this patent is extended or adjusted under 35 U.S.C. 154(b) by 303 days.

(21) Appl. No.: 15/475,123

(22) Filed: Mar. 30, 2017

(65) Prior Publication Data

US 2017/0208156 A1 Jul. 20, 2017

Related U.S. Application Data

(63) Continuation of application No. 13/612,854, filed on Sep. 13, 2012, which is a continuation of application No. 11/724,262, filed on Mar. 15, 2007, now abandoned, which is a continuation-in-part of application No. 11/011,465, filed on Dec. 13, 2004, now abandoned.

(51) Int. Cl.
H04B 1/44 (2006.01)
H04N 7/10 (2006.01)
F25D 29/00 (2006.01)
H04N 7/18 (2006.01)
H01J 31/12 (2006.01)
H04M 1/02 (2006.01)
H04M 1/725 (2006.01)
F25D 27/00 (2006.01)

(52) U.S. Cl.
CPC ............ *H04N 7/106* (2013.01); *F25D 29/00* (2013.01); *H01J 31/123* (2013.01); *H04M 1/0202* (2013.01); *H04M 1/72519* (2013.01); *H04N 7/183* (2013.01); *H04N 7/185* (2013.01); *H04N 7/186* (2013.01); *F25D 27/00* (2013.01); *F25D 2400/361* (2013.01); *F25D 2500/06* (2013.01)

(58) Field of Classification Search
CPC ........ H04N 7/106; H04N 7/183; H04N 7/186; H04N 7/185; H04N 5/374; H04M 1/72519; H04M 1/0202; H01J 31/123; F25D 29/00; F25D 2400/361; F25D 27/00; F25D 2500/06
USPC .......................................................... 455/78
See application file for complete search history.

(56) References Cited

U.S. PATENT DOCUMENTS

| | | | |
|---|---|---|---|
| 6,611,099 B1 * | 8/2003 | Murata | G09G 3/2932 313/483 |
| 2005/0206298 A1 * | 9/2005 | Lee | H01J 9/247 313/495 |
| 2010/0056054 A1 * | 3/2010 | Yamato | H04W 52/50 455/41.2 |

* cited by examiner

*Primary Examiner* — Ajibola A Akinyemi
(74) *Attorney, Agent, or Firm* — Chih Feng Yeh; Huntington IP Consulting Co., Ltd.

(57) ABSTRACT

A mobile phone includes a control unit, a first wireless module coupled to the control unit, a second wireless module coupled to the control unit, a first transparent substrate having a first conductive line and a second transparent substrate having a second conductive line, fluorescent substances are formed between the first transparent substrate and the second transparent substrate, wherein a bias is applied to excite the fluorescent substances by combination of an electron and a hole to emit visible light, thereby removing backlight of the mobile phone. An antenna is disposed at side of the first transparent substrate to improve receiving or transmission.

20 Claims, 5 Drawing Sheets

MOBILE PHONE WITH FLUORESCENT SUBSTANCES

CROSS-REFERENCE TO RELATED APPLICATIONS

The application is a continuation application of Ser. No. 13/612,854, filed on 13, Sep. 2012, which is a continuation application of Ser. No. 11/724,262, filed on 15, Mar. 2007, now abandoned, which is a continuation-in-part application of Ser. No. 11/011,465, filed on 13, Dec. 2004, now abandoned, the disclosure of which are hereby incorporated by reference in their entirety.

TECHNICAL FIELD

The present invention relates generally to a portable device, and more particularly to a mobile phone with fluorescent substances.

BACKGROUND

Cellular communications systems typically include multiple base stations for communicating with mobile stations in various geographical transmission areas. Each base station provides an interface between the mobile station and a telecommunications network. Mobile telephone systems are in use or being developed in which the geographic coverage area of the system is divided into smaller separate cells, it communicates with the network via a fixed station located in the cell. Mobile telephones belonging to the system are free to travel from one cell to another. When a subscriber within the same system or within an external system wishes to call a mobile subscriber within this system, the network must have information on the actual location of the mobile telephone.

Recently, the price of cellular telephone has been greatly reduced and become affordable to lots of people. It is common that a person owns more than one cellular phone. Some people even replace their cellular telephones as often as they replace their clothes or hairstyle. The cellular manufactures have to release new models with different appearances, function and styles more frequently so as to attract the attention of the buyer and occupy a favorable marketing share. Furthermore, the conventional LCD display has a lot of drawbacks, for example, the LCD display needs back light module which increases the thickness of the panel and it is not transparent. Liquid crystal material and color filter are also essential components to the display. Moreover, the device requires large arrays of thin film transistors, the manufacture is complicated and the resolution is not high enough. Further, the antenna of the conventional device is embedded within the device, and shield by a lot of IC or components. The signal reception is interrupted by a lot of device and EM shielding effect. The mouse is inconvenient to a user, especially, to a portable device. There is a desired to remove the mouse device. As recognized herein, for portability, it is desirable to configure the projector to be as slim as possible. But the goal of size reduction is frustrated by the present of the elements mentioned above.

SUMMARY

The object of the present invention is to provide a device with hybrid memory and advanced display with thinner transparent panel on which a transparent antenna may be formed to minimize the shielding effect. The further object of the present invention is to provide a computing device with a video display comprising a substrate having electrodes. A mask layer covers a portion of the electrodes, stacked gates is over the mask layer. Emitters are formed on a portion of the electrodes to emit electrons, wherein the stacked gates are used for extracting electron beam from the emitters, wherein the emitters is formed with carbon nanotube emitter to improve video images and local brightening for display; and a panel disposed above the stacked gates; a fluorescent film attached to a surface of said panel and the fluorescent film being hit by electron emitted from the emitter to emit color for display.

The present invention provides a portable device comprising: a control unit; a display coupled to the control unit; a dual wireless module coupled to the control unit for wireless data transferring, wherein the dual wireless module includes a first and a second wireless data transferring modules to allow a user to select desired one to communicate with an external device. The dual wireless module further includes a management unit to manage the first and second wireless data transferring modules according to a policy engine. The first and second wireless data transferring modules are selected from a group consisting of blue-tooth, 802.11x, WiFi, WiMAX, standard and their update version. It also includes a hybrid memory consisting of nonvolatile memory and hard disc, or consisting of NOR device and NAND device.

A device comprises a control unit; a display coupled to the control unit; a hybrid memory coupled to the control unit, wherein the hybrid memory includes a first type memory and a second type memory. The portable device further comprises an embedded system coupled to the control unit to determine or assign the duty of the first and second type memories. The first type memory includes hard disc, and the second type memory includes nonvolatile memory. Alternatively, the first type memory includes NOR device, and the second type memory includes NAND device, wherein the first type memory and second type memory share an address decoder.

A device comprises a control unit; a memory coupled to the control unit to store data; a substantially transparent panel to minimizes EM shielding effect, wherein the substantially transparent panel includes a first substrate having a transparent electrode coupled to the control unit, a stacked gate formed over the first substrate and emitters formed adjacent to the stacked gate, a second substrate having fluorescent substances spaced apart from the first substrate, wherein the fluorescent substances emits green, blue or red light while electrons emitted by the emitter contact to the fluorescent substances. The portable device further comprises an antenna located corresponding to the substantially transparent panel to minimize the EM shielding effect, thereby improving signal receiving/transmitting performance. Alternatively, the portable device comprises at least one transparent antenna attached on the substantially transparent panel to minimize the EM shielding effect.

The present invention discloses a computing device comprising: a control unit and a display; a detecting source for generating a detecting light to eye of a user; a sensor in responsive to the detecting light back from the eye to generate an output signal, thereby generating eye movement information; a cursor control module in responsive to the eye movement information to drive a cursor on the display corresponding to the eye movement information. The computing device further comprises a touch screen module coupled to the control unit to generate at least one button-image on the display along with the cursor. Alternatively, the computing device further comprises an input interface to allow the user to active "click on" action. The computing device includes but not limited to notebook, PC, cellular, PDA and the like.

A digital camera comprises a control unit and a display; a detecting source for generating a detecting light to eye of a user; a sensor in responsive to the detecting light back from the eye to generate an output signal, thereby generating eye movement information; a cursor control module in responsive to the eye movement information to drive a face indicator on the display corresponding to the eye movement information. The digital camera further comprises a touch screen module coupled to the control unit to generate at least one button-image on the display; a wireless data transferring module coupled to the control for data transferring with an external device.

DETAILED DESCRIPTION

The present invention relates generally to a computing or portable device. The device includes but not limited to cellular phone, PDA (personal digital assistant), smart phone, notebook, digital still camera, digital video camera, medium player (MP3, MP4), GPS and the equivalent thereof.

Figure 2:
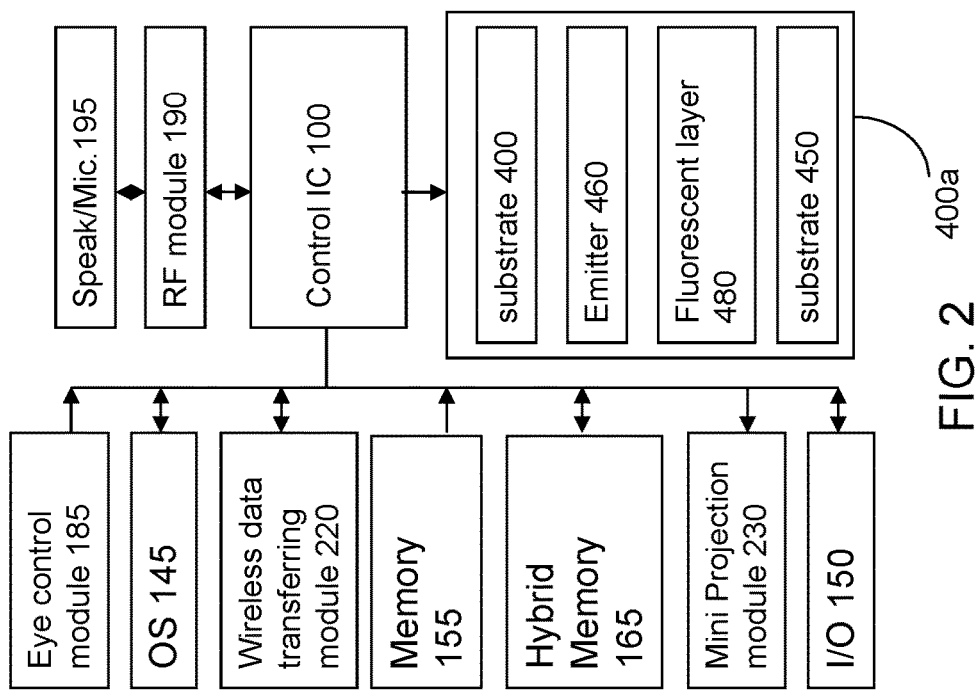
FIG. 2 shows a diagram of a portable device according to the present invention.
Figure 1:
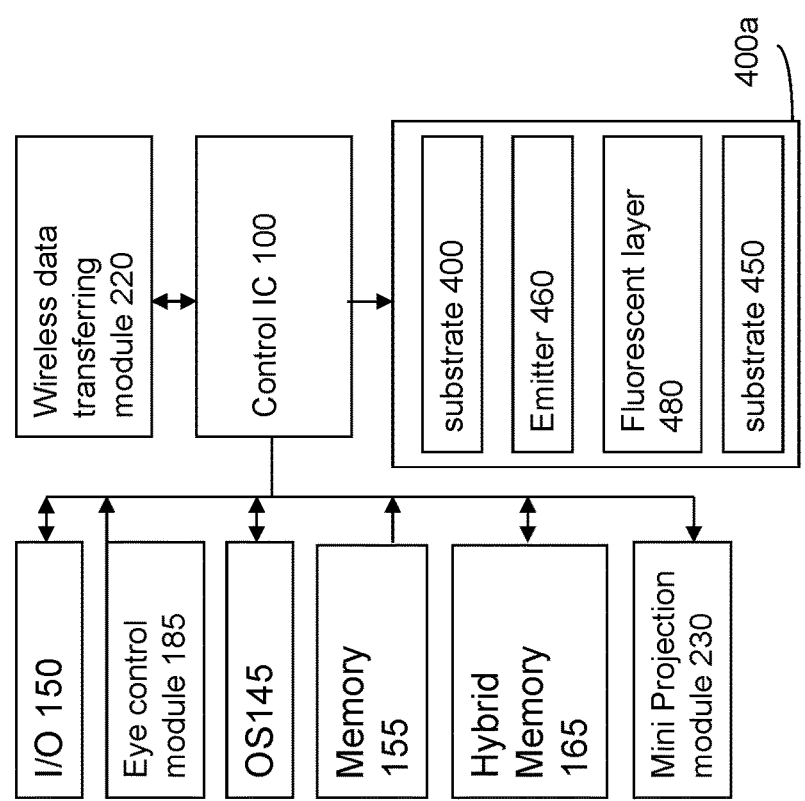
FIG. 1 shows a diagram of a portable device according to the present invention.

FIG. 1 is a diagram illustrating main components of a portable communication device using a panel with emitters and transparent substrate according to an embodiment of the present invention. The embodiment, as shown in FIG. 1 and FIG. 2, the device 20 includes a RF module 190. As know in the art, the RF module 190 includes antenna. This antenna is connected to a transceiver, which is used to receive and transmit signal. AS known, the RF module 190 further includes CODEC, DSP and A/D converter as well. Due to the RF module is not the feature of the present invention, therefore, the detailed description is omitted. Other major components between device 10 and 20 are similar, therefore, the same reference numbers refers to similar component, however, the version, grade and performance maybe different. The present invention includes a central control IC 100, an input and output (I/O) unit 150, OS 145, hybrid memory 165, the device 10 or 20 may includes other memory 155 such as ROM, RAM and FLASH memory. The RF module may perform the function of signal transmitting and receiving, frequency synthesizing, base-band processing and digital signal processing. If the portable device is cellular, SIM card hardware interface is provided for receiving a SIM card. Finally, the signal is send to the final actuators, i.e. a loudspeaker and a microphone 195 or I/O 150.

The present invention further includes a wireless transmission/receiving module 220 coupled to the control IC 100. The transmission/receiving module is compatible with bluetooth, home-RF, 802.11x, WiFi, WiMAX standard or their higher version. The transmission domain (the air) by nature is not secured and therefore encryption maybe essential in the wireless transport networks. In one embodiment, pairwise encryption/decryption between every neighboring wireless network device of a wireless transport network is well-known in the art. A data frame that leaves from one wireless device from one end of a wireless transport network to the other end of the same network might need several encryptions and decryptions before it reaches its final destination. A mini projection module 230 maybe incorporated into the portable device, the mini projection module 230 may refer to the co-pending application Ser. No. 11/734,175, filed by the same inventor of the application.

Figure 4:
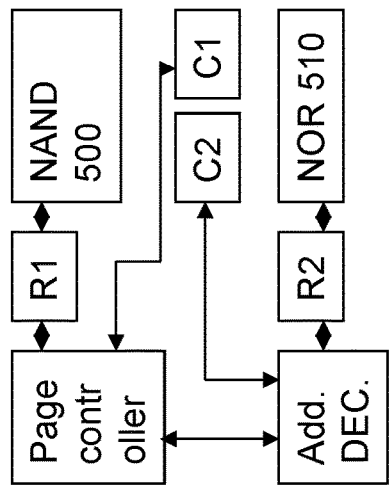
FIG. 4 shows a diagram of hybrid memory according to the present invention.
Figure 3:
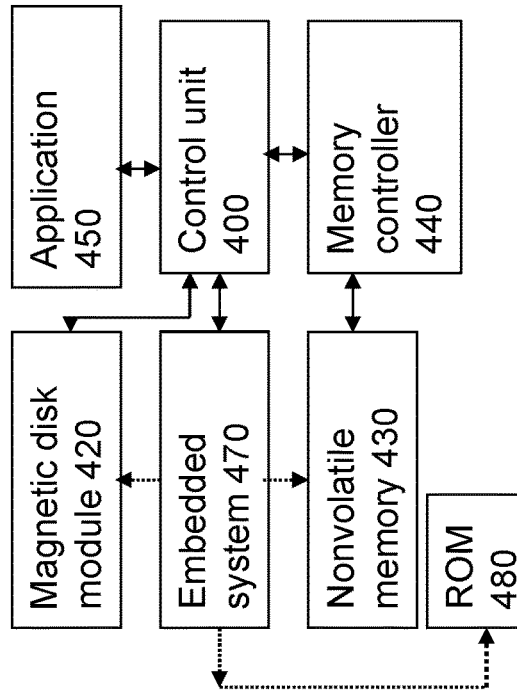
FIG. 3 shows a diagram of hybrid memory according to the present invention.

Optionally, the present invention also provides a hard disk drive incorporated with a Flash memory within one single unit, as shown in FIG. 3 to have the benefits of both. The hard disk drive includes a control unit 400 coupled to a magnetic disk module having spindle driver, reading/writing head mechanism and so on. This is well-known in the art, the description is omitted. A flash controller 440 is coupled to the control unit 400 and a nonvolatile memory 430 is coupled to the flash controller 440. An application 450 is coupled to the control unit to execute the instruction. The hybrid hard disc drive incorporates the flash memory into the device to yield the benefit of high-speed access and low power consumption. The hard disk drive maybe incorporated into portable media player, cellular, notebook or PDA. A controller 440 is connected to the flash memory 430 to operate the mode under instruction or command. The operation mode includes read mode, write mode, erase mode, and programming mode. Further, the controller 440 maybe integrated into the control unit 400 under the knowledge and technology of integrated circuits. An embedded system 470 is optionally stored in the erasable/programmable storage medium (flash, ROM or hard disk). It could be an application, software or a list of computer-executable instructions. Alternatively, the ROM 480 may be embedded in the control unit. The data coded in the ROM will not be erased by the user. The embedded system 470 could be provided for a computer or device to execute predetermined function such as operating some application, booting the device, auto backup or auto-run file. In general, after a device is power on, basic input/output system will perform a boot sequence before invoking the OS. Basic input/output system is set in the ROM. The programmer or instruction can be set in the embedded system to determine what type of data will be stored into what type of storage (flash or hard disk). It could be used for different type of volatile memory having NOR device and NAND device (FIG. 4). A hybrid memory scheme may refer to the above co-pending application filed by the identical inventor of the application, entitled "Monitoring System with a Wireless Transmitting/Receiving Module". The co-pending application is incorporated herein for reference. Under such configuration, the computing device, for example, personal computer, notebook, may omit the hard disc drive. The scheme uses NOR device to act and replace the role of hard disc to store operation system and yield the benefit of high speed operation and low power consumption, while the data is stored in the NAND device.

The operation speed will be higher than the one employing hard disc. In one embodiment, the embedded system is coupled to the control unit to determine or assign the duty of the magnetic disk module 420 and the nonvolatile memory 430. The flash benefits high speed performance, low power consumption while hard disk drive yields lower cost and high capacity. The storage architecture refers to Complementary Storage Device (CSD). The CSD has the benefits of the both type of memory. The manufacture may reduce the cost and increase the performance by incorporating the two kind of memory with an optimized memory ratio between the flash memory and the magnetic memory.

Figure 5:
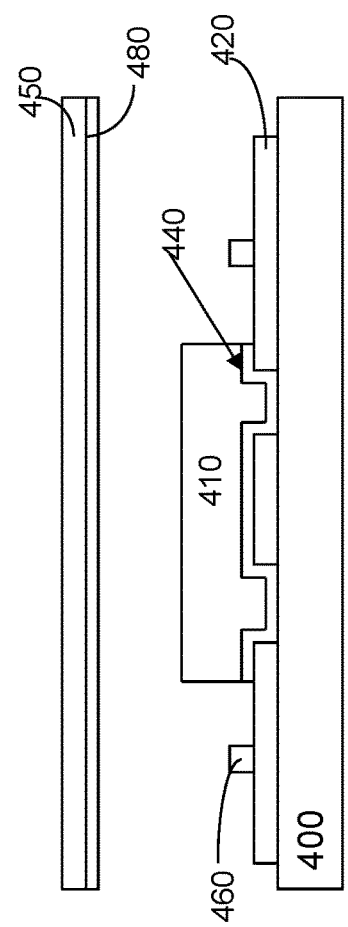
FIG. 5 shows a diagram of field emitter device according to the present invention.

Almost all conventional devices include an antenna located at the top and within the portable device, the signal receiving performance is poor due to EM shielding effect generated by the shield, circuits, circuit board and other components. If the antenna to the signal is "transparency", the performance will be improved. Therefore, in another aspect of the present invention is to provide an antenna located corresponding to a substantially transparent display panel to minimize the EM shielding effect, thereby improving signal receiving/transmitting or energy charging performance. Preferably, at least one transparent antenna is attached to the side of the substantially transparent display panel to minimize the EM shielding effect. As seen in FIGS. 1 and 2, a substrate 400 is provided and transparent electrodes 420 are formed on the glass substrate 400. The substrate 400 could be silicon, glass, quartz or the like. It means that the shell of the mobile phone could be glass or polymer instead of metal or alloy due to the metal or alloy will shield the EM wave. The embodiment of the present invention is shown in FIG. 5, it is a cross-sectional view of the field emission device according to the present invention. As seen in FIG. 5, the field emission devices array 4000 includes a transparent substrate 400 and transparent electrodes 420 are formed on the transparent glass substrate 400. The transparent electrodes 420 may be made of indium tin oxide (ITO) and may be used as the emitter electrodes. Stacked gate 410 that cover a portion of the transparent electrodes 420 are formed on the transparent glass substrate 400. Emitters 460 that emit electrons are formed on a portion of the transparent electrode 420. Each stacked gate 410 includes a mask layer 440 that covers a portion of the transparent electrodes, and is formed by UV photolithograph mask. The mask layer 440 is preferably transparent to visible light, but opaque to ultra violet rays and can be made of an amorphous silicon layer. The silicon layer will be transparent when the thickness is thin enough. A stacked gate 410 structure includes first insulating layer/a gate electrode/a second insulating layer/focus gate electrode, sequentially formed over the substrate. The gate insulating layer is preferably a silicon oxide thin film and the gate electrode is made of chrome. The gate electrode is used for extracting an electron beam from the emitter. The focus gate electrode performs as a collector for collecting electrons emitted from emitter so that the electrons can reach a fluorescent film 480 disposed above the emitter 460. If the filed emitting device is used for display, the substrate can be silicon or transparent substrate. Referring to FIG. 5, a front panel (substrate) 450 is disposed upward and above the stacked gate. A variety of visual images are displayed on the front panel 450. A fluorescent film 480 is attached to a bottom surface of the front panel 450 that faces the stacked gate and a direct current voltage is applied to the fluorescent film 480 to emit color for display. The fluorescent substance may emit color light by mixing the emitted light if the thin film with R, B fluorescent substances when the fluorescent film 480 is hit by the electron emitted from the emitter. Preferably, the fluorescent substances emit red, green, and blue visible light when excited by the electron beam is evenly distributed on the fluorescent film 480. Any color including white color can be mixed by the R, B fluorescent substances. White color is provided by white fluorescent substances. The spacer separating the front panel 450 from the stacked gate is a black matrix layer and is not shown for convenience. Due to the thin film display if formed with thinner thick and the power consumption is lower than LCD, the present invention may provide smaller size, lighter weight device. The life time of battery may last longer. The field emission device does not require complicated, power-consuming back lights and filters which are necessary for LCD. Moreover, the device does not require large arrays of thin film transistors, and thus, a major source of high cost and yield problems for active matrix LCDs is eliminated. The video image resolution of the display and the local brightness can be improved by using a focus grid to collimate electrons drawn from the microtips. Preferably, the emitter includes a carbon nanotube emitter to further reducing the device size. The conductive carbon with nano-scale may reduce the width of the conductive electrode, thereby reducing the scale of electrode and increasing the resolution without down grade the performance. The CNT and the conductive polymer have better conductivity than prior art bulk silicon even minimizing the size of the structure. It may provide the local illumination and local brightness over the prior art. The CNT and the conductive polymer have better conductivity than prior art bulk silicon even minimizing the size of the structure. It may improve the electronic transmitting rate with transparent characteristic when it is formed with thinner thickness. The carbon nanotube emitter has smaller and sharper tip, the electronics may concentrates the tips by the corona discharge effect, thereby improving the electronic emitting performance. If a charged object has a sharp point, the air around that point will be at a much higher gradient than elsewhere. Air near the electrode can become ionized (partially conductive). When the air near the point becomes conductive, it has the effect of increasing the apparent size of the conductor. Further, the display may omit the liquid crystal material. Further, the field emission display does not require the S/D regions which are required by TFT for LCD. If LCD is used, the above field emission devices with CNTs may be employed to emit illumination to act as back light for the LCD needs. No matter the display is FED display or LCD display, the carbon nanotube (CNT) field emitter may improve video images for display and is operated with locally controllable luminance and local dimming, local brightening. As known in the art, the LC (liquid crystals) module includes a display unit having a first (rear) polarizer, a first transparent (such as glass) substrate and a first transparent electrode. A transistor array is formed over the first transparent electrode. LC (liquid crystals) is formed over the transistor. A second (front) transparent electrode is formed over the LC and a second (front) transparent substrate and color filter are subsequently formed over the LC. A protection glass and second (front) polarizer are formed over the color filter. The transistor array is formed over the substrate and the gate of the transistor is patterned and isolation layer is formed over the gate.

Figure 6:
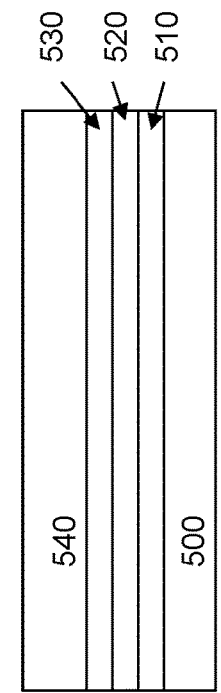
FIG. 6 shows diagram of a EL according to the present invention.

In another embodiment, the display is shown in FIG. 6. The display includes a transparent electrode 510 on a transparent substrate 500. A fluorescent film or power 520 is attached to an upper surface of the lower transparent electrode 510. Preferably, the fluorescent substance emits color light. The present invention includes three such devices that separately display image in red components, green components, and blue component. Each irradiates single color light. Different powder will emit different color. An upper transparent electrode 530 is formed on the fluorescent film or power 520. A second transparent substrate 540 is formed on the transparent electrode 540. A bias is applied on the electrodes to inject hole and electron, thereby exciting the fluorescent substances by the combination of the electron and hole to emit red, green, or blue visible light depending on the compound of the fluorescent substances. The elements may refer to ELP.

Figure 7:
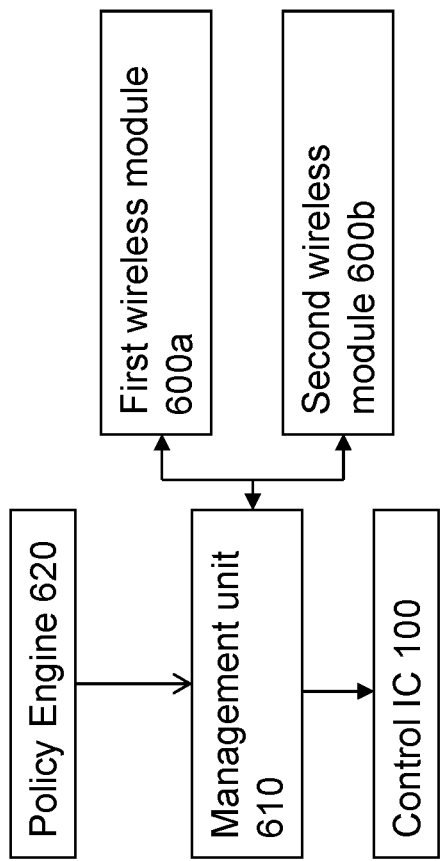
FIG. 7 shows a diagram of dual wireless module according to the present invention.

In another embodiment, the wireless data transferring module 220 includes dual mode module. Please refer to FIG. 7, in one case, the wireless data transferring module 220 includes a first and second wireless module 600a and 600b for wireless transmission. The dual modules 600a and 600b are coupled to a management unit 600 to manage the dual modules according to the policy set in a policy engine 610. For example, the policy in the policy engine 610 includes at least the transmission priority policy to determine which module will be the default module to receive/transmit data. It also includes the switching condition for switching there between. For example, the signal strength is one of the facts for switch condition. It also allows the user to set or alter the condition via user interface. The first and second wireless module maybe one of the following module: blue-tooth, 802.11x, WiFi, WiMAX, 3G standard or their higher (update) version. Preferably, the first wireless module is WiFi and the second wireless module is WiMax. The present invention may yield the benefits of both. For example, the access range of WiFi is shorter than WiMax, but it consumes lower power. If within the office area, the AP for WiFi may be employed to prevent others outside the office from accessing the server of the office. In another aspect, if the user would like to access or remote control a terminal device located at several miles away, the WiMax is chosen. The WiFi benefits security, low power consumption while WiMax yields long range and high bandwidth. The module architecture refers to dual wireless module (DWM). The DWM has the benefits of the both type of module. The first wireless module is compatible to a first communication protocol, while the second one is compatible to a second communication protocol. The manufacture may increase the performance by incorporating the two kind of wireless module memory with an optimized configuration. The protocol maybe adapted to wireless local area network or wireless mediate area network.

From above, the thick and complicated LCD panel is removed, thereby reducing the thickness of the portable device and a lot of elements such as color filter, LC material, back light module are also skipped from the present invention. Furthermore, due to the substrate 400, 450 could be formed by glass, quartz or the like, therefore, the present invention may offer unexpected and funny visual effect. Under the sleep mode or off state of the device, the panel is substantial transparent, while the device is not operation or standby, or at the sleep mode, the panel may acts as digital photo album due to the panel is transparent. Further, the user may alter the color, image pattern displayed on the panel when the device is in the sleep mode or off-state. The user may determine the pattern and image for the panel cover. Furthermore, a transparent antenna may be attached on the transparent panel to provide better signal transmission due to EM shield effect of the antenna will be minimized while the antenna is not set within and at the top of the device. In this case, the antenna is composed by a material includes oxide containing metal or alloy, wherein the metal is preferable to select one or more metals from Au, Zn, Ag, Pd, Pt, Rh, Ru, Cu, Fe, Ni, Co, Sn, Ti, In, Al, Ta, Ga, Ge and Sb. Some of the transparent material includes oxide containing Zn with $Al_2O_3$ doped therein.

Figure 8:
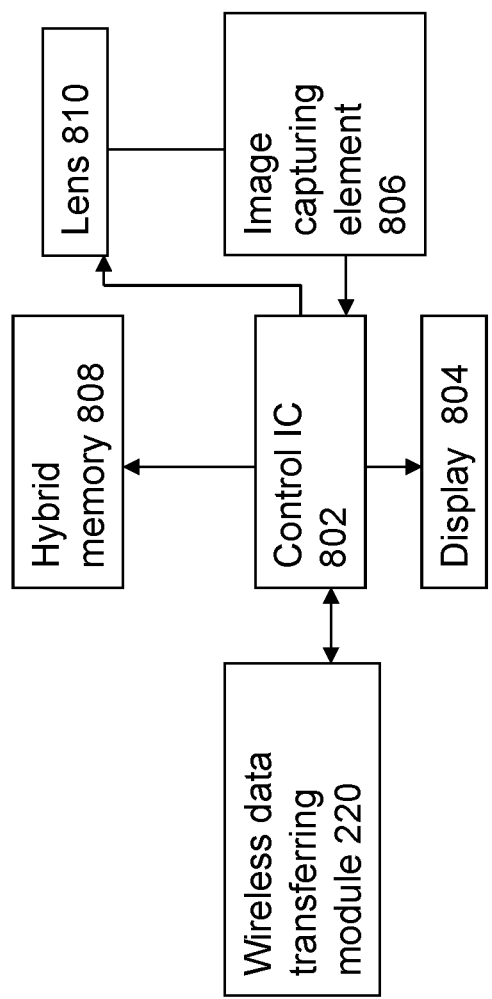
FIG. 8 shows a diagram of digital camera according to the present invention.
Figure 9:
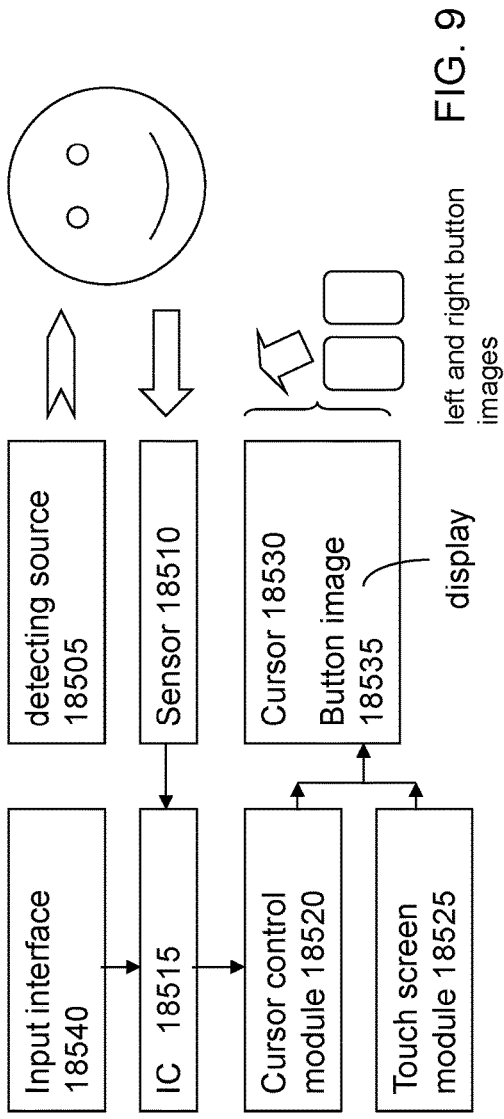
FIGS. 9 and 11 show a diagram of eye control module according to the present invention.
Figure 10:
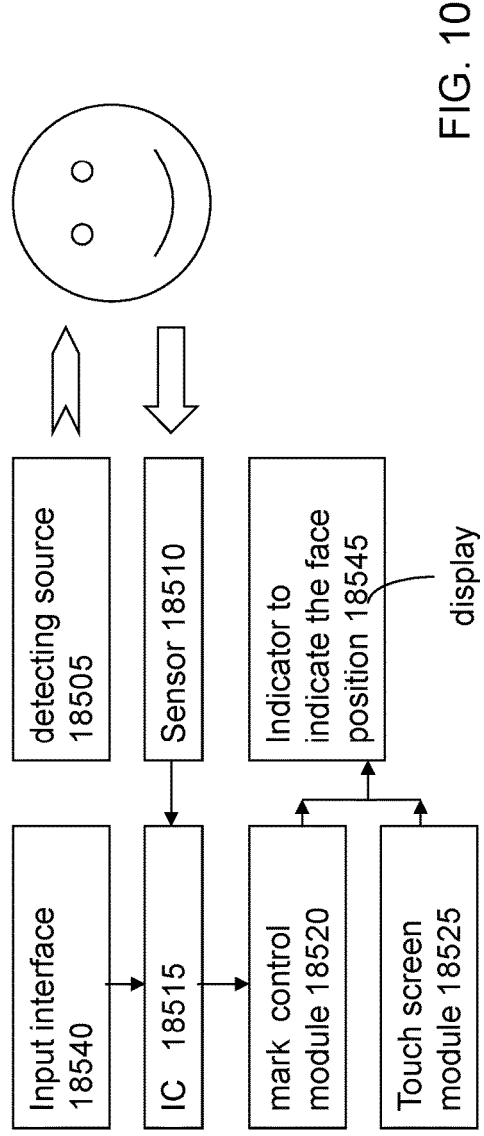
FIG. 10 shows a diagram of face detection module according to the present invention.

Further, referring to FIG. 8, the wireless transferring module 220 and hybrid memory maybe employed by a digital camera or digital video camera. Preferably, the device includes a main body having a control IC 802; a display 804 formed on the main body and coupled to the control IC 802; an image capture element 806 formed within the main body and coupled to the control IC 802; the hybrid memory 808 is coupled to the processor; a lens mechanism 810 is formed on the main body, coupled to the control IC 802 and corresponding to the image capture element 806; the wireless transferring module is coupled to the processor for data transferring with external device.

If the present invention is employed for medium player such as MP3 player, MP4 player, the player includes an analog/digital (A/D) converter for converting analog audio signals into digital audio signals. The analog audio signals can come from an audio source coupled to player. A digital signal processor (DSP) or an audio and/or video driving module, for instance MP3, MP4 codec, are coupled to A/D converter to receive the digital audio signals. In one embodiment, MP3 or MP4 codec executes a firmware that includes a MPEG audio layer (e.g., MP3, MP2, or both) codec or video codec (e.g., MP4), and DSP executes a firmware that includes a different type of audio codec (e.g., WMA, ACC, or both). In one embodiment, the firmware for DSP also includes a video codec for encoding and decoding videos (e.g., MPEG-4 V1/V2/V3, DivX 3.11/4.0/5.0, Xvid, AVI/ASF, or any combination thereof). MP3 (or MP4) codec and DSP are coupled to a nonvolatile memory that stores the compressed audio data. The user can select an audio file from nonvolatile memory. DSP are coupled to an audio processor, which processes the digital audio signals according to default settings or user instructions. Audio processor is coupled to a digital/analog (D/A) converter, which converts the digital audio signals into analog audio signals for the user.

The present invention also provides a user control module to control the cursor without mouse or touchpad. A computing device comprises a display and a detecting device for detecting motion of a user. A movement information generating device is in responsive to the detection to generate an output signal, thereby generating movement information. A virtual object control module is in responsive to the movement information to drive a virtual object on the display corresponding to the movement information. Referring now to the drawings 1-2 and 9, there is shown in schematic form the basic components of the control module 185 incorporating the eye or face control module according to a preferred embodiment of the invention. The present invention includes a step of detecting the motion of a user (refers to a subject). Preferably, the portion for detection could be eye, face, finger or the like. The eye, face, or finger detection will be introduced as one of the examples to illustrate the features of present invention. The subject's finger, face or eye is positioned relative to a sensor so that initially the subject's gaze is aligned along center line toward a pupil stimulus and fixation target if eye is detected. The eye control module 185 includes sensor and IC to detect eye motion and generate a control signal. The face motion could be used to practice the present invention. A detecting source 18505 is provided, the pupil of the eye(s) is (are) illuminated by the light source 18505, for example, an infrared ray (IR) or light emitting diode (LED) is used to measure or detect the subject.

Figure 11:
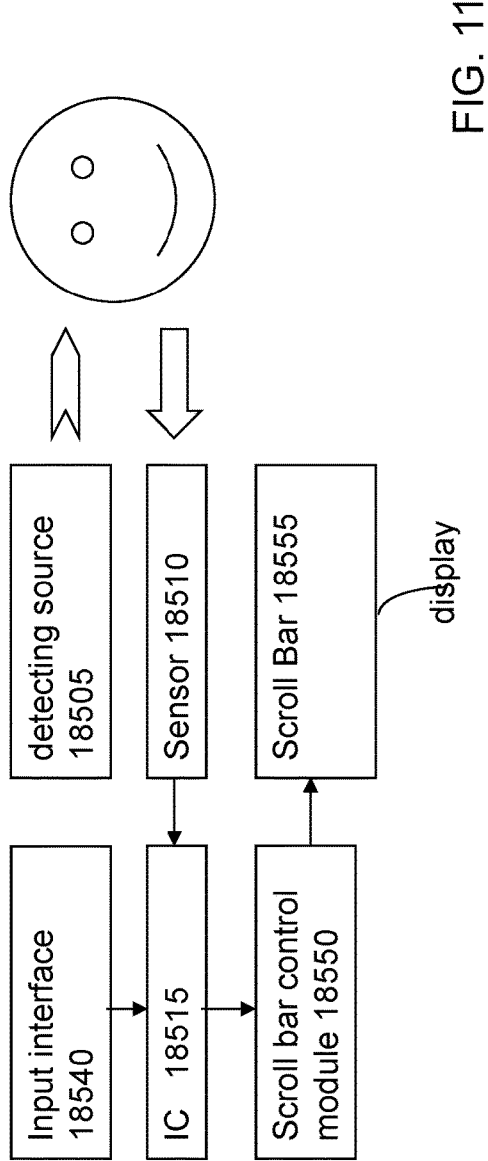
Figure 12:
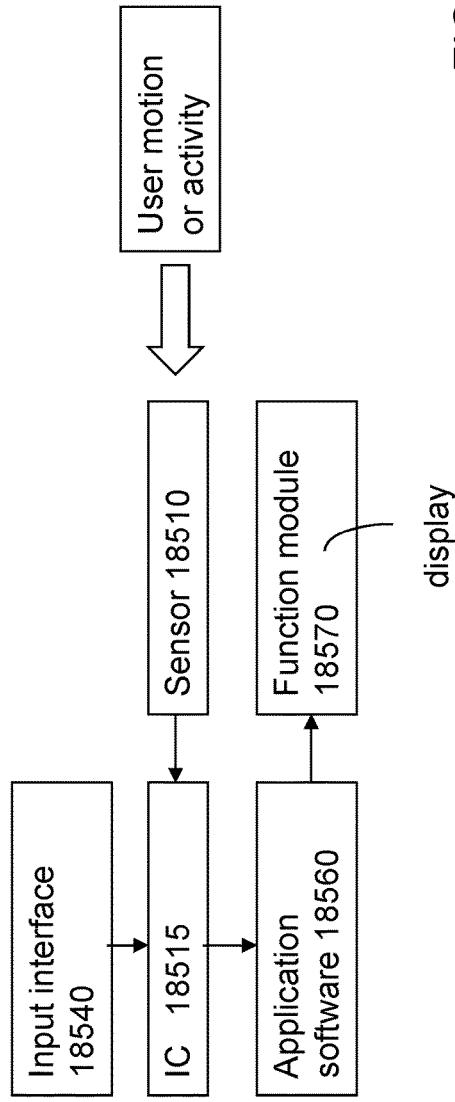
FIG. 12 shows a diagram of motion detection module according to the present invention.

Preferably, dual source LED is used to project two spatially separated spots at the subject's pupil if the eye is detected. The dual source LED is constructed by placing two LED side by side on the panel 400*a* of the portable device. Back light from the subject's eye is detected by a sensor 18510 directly or via other optical mirror or lens. The present invention includes the method to detect the user face, finger, eye motion or image by the sensor. The sensor 18510 could be optical sensor such as CMOS sensor or CCD. The outputs from the sensor 18510 are input to a processor or control integrated circuits 18515 to generate a control signal to a control module 18520 for controlling virtual object on the display or panel or execute an instruction or order. Preferably, the detecting source or the like scans the position of the pupil of eye(s), or measure or detect the subject location (position). In this process the pupil is illuminated by a light source, so that the geometric form of the pupil can be portrayed clearly on the sensor. Alternatively, the face or finger image of the user could be detected by the present invention. By means of image processing, the pupil position information is evaluated and to determine where the eye in the display is looking. The control signal may drive the object to the predetermined position through control module 18520. A buttons-image (or button-icons) may be generated along with the cursor by an image generator 18525. In one case, the image generator 18525 maybe a touch screen module which may generate touch screen image via well-known touch screen technology, in the manner, the user may "click on" the virtual bottom to input a command by means of "clicking" the touch screen. Alternatively, the click signal maybe input from input interface 18540 such as (the right and left buttons of) the keypad, vocal control through microphone, eye motion through the sensor 18510. In the case of vocal control, another software/hardware maybe necessary to process the steps of object selection through voice recognition hardware and/or software. For example, the action of close left eye refers to click left button while the action of close right eye refers to click right button. If both eyes close, it may refer to select one item from a list. The above default function may be practiced by a program and software. It should be understood by persons skilled in the art, the foregoing preferred embodiment of the present invention is illustrative of the present invention rather than limiting the present invention. Modification will now suggest itself to those skilled in the art. Under the method disclosed by the present invention, the user may control certain functions automatically without the mouse. Similarly, the control signal may be used to drive the scroll bar moving upwardly or downwardly without clicking the bar while reading document displayed on the screen, as shown in FIG. 11. Thus, the control signal generated by IC will be fed into the control module 18550 to drive the virtual object on the display moving upwardly or downwardly without the mouse or keypad or giving an instruction or order to the mobile phone. An eye controllable screen pointer is provided. The eye tracking signals are performed in a calculation by a processing means residing in a processor or integrated circuits to produce a cursor on the screen.

The sensor is electrically coupled to the controller (IC) 18515 via line. In a preferred embodiment, input controller 18515 comprises a semiconductor integrated circuit or chip configured to receive, interpret and process electrical signals, and to provide output electrical signals. Output signals from IC 18515 comprise signals indicative of movement of eye in a direction corresponding to the direction of actual cursor movement on the display intended by the user. The present embodiment takes into account a possible "dragging" situation that the user may be faced with. On occasion, some users have a need to "drag" an icon or other object from one area of the screen to another. On some computers, to accomplish this, the user must hold down the left click button and control the pointing device at the same time. If a touchpad is being used as the pointing device, and the object must a dragged a long distance across the screen, sometimes the user's finger may reach the edge of the touchpad. This situation is easily handled by the present invention. In such a situation, the controller may send the command (e.g. "click left mouse button", while dragging) repeatedly until the user's finger leaves a keyboard key (stops pressing a key).

Therefore, the present invention providing a method of pointing a mark such as cursor, bar on a screen, the method includes detecting motion of a user (such as eye, face, finger motion) and a sensor is in responsive to the detection of the eye to generate an output signal, thereby generating movement information; A control module is in responsive to the user movement information to drive a virtual object on the display or issue an instruction to execute certain functions corresponding to the movement information.

Similarly, the above method maybe used for face tracing in the field of digital still camera or digital video camera to tracking the face of the subject. By the almost same scheme, a face indication (or mark) module 18545 is responsive to the control signal to mark the face on the screen, thereby tracking the face for the digital camera. A digital camera comprises a control unit and a display; a detecting source for detecting eye of a user who is under photographed; a sensor in responsive to the detecting light back from the eye to generate an output signal, thereby generating eye movement information; a cursor control module in responsive to the eye movement information to drive a face indicator on the display corresponding to the eye movement information. The digital camera further comprises a wireless data transferring module coupled to the control unit for data transferring with an external device.

As will be understood by persons skilled in the art, the foregoing preferred embodiment of the present invention is illustrative of the present invention rather than limiting the present invention. Having described the invention in connection with a preferred embodiment, modification will now suggest itself to those skilled in the art. Thus, the invention is not to be limited to this embodiment, but rather the invention is intended to cover various modifications and similar arrangements included within the spirit and scope of the appended claims, the scope of which should be accorded the broadest interpretation so as to encompass all such modifications and similar structures. While the preferred embodiment of the invention has been illustrated and described, it will be appreciated that various changes can be made therein without departing from the spirit and scope of the invention.

I claim:

1. A mobile phone comprising:
   a control unit;
   a first wireless module coupled to said control unit;
   a second wireless module coupled to said control unit;
   a front transparent substrate having a first conductive line and a rear transparent substrate having a second conductive line, fluorescent substances are formed between said front transparent substrate and said rear transparent substrate, wherein a bias is applied to excite said fluorescent substances by combination of an electron and a hole to emit visible light, thereby removing backlight of said mobile phone;

an antenna disposed at side of said rear transparent substrate to improve receiving or transmission.

2. The mobile phone of claim 1, further comprising a management unit to manage said first and said second wireless modules.

3. The mobile phone of claim 2, wherein said management unit determines a transmission priority module for receiving or transmitting data.

4. The mobile phone of claim 3, wherein said management unit comprises a switch for switching between said first and said second wireless modules, wherein a signal strength is one of the facts for switch condition.

5. The mobile phone of claim 2, wherein said management unit includes a user interface to allow a user to set or alter a condition.

6. The mobile phone of claim 1, wherein said antenna includes ITO, carbo nanotube, conductive polymer or the combination thereof.

7. The mobile phone of claim 1, wherein said first conductive line includes ITO, carbo nanotube, conductive polymer or the combination thereof.

8. The mobile phone of claim 1, wherein said second conductive line includes ITO, carbo nanotube, conductive polymer or the combination thereof.

9. The mobile phone of claim 1, further comprising a hybrid memory scheme including a NOR device to store operation system and a NAND device to store data.

10. A mobile phone comprising:
a control unit;
a first wireless module coupled to said control unit;
a second wireless module coupled to said control unit;
a first transparent substrate having a first conductive line and a second transparent substrate having a second conductive line, fluorescent substances are formed between said first transparent substrate and said second transparent substrate, wherein a bias is applied to excite said fluorescent substances by combination of an electron and a hole to emit visible light, thereby removing backlight of said mobile phone;
an antenna disposed at side of said first transparent substrate to improve receiving or transmission;
a management unit to manage said first and said second wireless modules and to determines a transmission priority module for receiving or transmitting data.

11. The mobile phone of claim 10, wherein said management unit comprises a switch for switching between said first and said second wireless modules, wherein a signal strength is one of the facts for switch condition.

12. The mobile phone of claim 10, wherein said management unit includes a user interface to allow a user to set or alter a condition.

13. The mobile phone of claim 10, wherein said antenna includes ITO, carbo nanotube, conductive polymer or the combination thereof.

14. The mobile phone of claim 10, wherein said first conductive line includes ITO, carbo nanotube, conductive polymer or the combination thereof.

15. The mobile phone of claim 10, wherein said second conductive line includes ITO, carbo nanotube, conductive polymer or the combination thereof.

16. The mobile phone of claim 10, further comprising a hybrid memory scheme including a NOR device to store operation system and a NAND device to store data.

17. A mobile phone comprising:
a control unit;
a first wireless module coupled to said control unit;
a second wireless module coupled to said control unit;
a first transparent substrate having a first conductive line and a second transparent substrate having a second conductive line, fluorescent substances are formed between said first transparent substrate and said second transparent substrate, wherein a bias is applied to excite said fluorescent substances by combination of an electron and a hole to emit visible light, thereby removing backlight of said mobile phone, wherein said first or said second conductive line includes ITO, carbo nanotube, conductive polymer or the combination thereof;
an antenna disposed at side of said first transparent substrate to improve receiving or transmission;
a management unit to manage said first and said second wireless modules and to determines a transmission priority module for receiving or transmitting data.

18. The mobile phone of claim 17, wherein said management unit comprises a switch for switching between said first and said second wireless modules, wherein a signal strength is one of the facts for switch condition.

19. The mobile phone of claim 17, wherein said management unit includes a user interface to allow a user to set or alter a condition.

20. The mobile phone of claim 17, further comprising a hybrid memory scheme including a NOR device to store operation system and a NAND device to store data.

* * * * *

UNITED STATES PATENT AND TRADEMARK OFFICE
CERTIFICATE OF CORRECTION

PATENT NO. : 10,313,630 B2  
APPLICATION NO. : 15/475123  
DATED : June 4, 2019  
INVENTOR(S) : Kuo-Ching Chiang It is certified that error appears in the above-identified patent and that said Letters Patent is hereby corrected as shown below:

On the Title Page

The item (63) "Related U.S. Application Data" is amended to read as follows:
Continuation of application No. 13/612,854, filed on Sep. 13, 2012, which is a continuation of application No. 13/347,659, filed on Jan. 10, 2012, now patent No. 8,878,796, which is a continuation-in-part of application No. 11/882,436, filed on Aug. 1, 2007, now patent No. 8,203,530, and application No. 11/889,602, filed on Aug. 15, 2007, now patent No. 8,614,676; and application No. 13/612,854 is a continuation of application No. 11/724,262, filed on Mar. 15, 2007, now abandoned, which is a continuation-in-part of application No. 11/011,465, filed on Dec. 13, 2004, now abandoned.

In the Specification

The "CROSS-REFERENCE TO RELATED APPLICATIONS" in Column 1, Lines 7-13 is amended to read as follows:
The application is a continuation application of Ser. No. 13/612,854, filed on Sep. 13, 2012, now abandoned, which is a continuation application of Ser. No. 13/347,659, filed on Jan. 10, 2012, now patent no. 8,878,796, which is a continuation-in-part application of Ser. No. 11/882,436, filed on Aug. 1, 2007, now patent no. 8,203,530, and Ser. No. 11/889,602, filed on Aug. 15, 2007, now patent no. 8,614,676; and Ser. No. 13/612,854 is a continuation application of Ser. No. 11/724,262, filed on Mar. 15, 2007, now abandoned, which is a continuation-in-part application of Ser. No. 11/011,465, filed on Dec. 13, 2004, now abandoned. The contents of Ser. Nos. 13/612,854; 11/724,262, and 11/011,465 are hereby incorporated by reference in their entireties.

Signed and Sealed this  
Thirty-first Day of December, 2024

Derrick Brent  
*Acting Director of the United States Patent and Trademark Office*